United States Patent [19]

Kasahara et al.

[11] Patent Number: 5,926,577
[45] Date of Patent: Jul. 20, 1999

[54] VIDEO SIGNAL PROCESSING APPARATUS WITH NOISE REDUCTION AND EDGE ENHANCEMENT

[75] Inventors: Misa Kasahara; Makoto Sube; Jun Ebisawa, all of Yokohama, Japan

[73] Assignee: Matsushita Electric Industrial Co., Ltd., Osaka, Japan

[21] Appl. No.: 08/637,490

[22] Filed: Apr. 25, 1996

[30] Foreign Application Priority Data

Apr. 26, 1995 [JP] Japan ................................ 7-102273

[51] Int. Cl.⁶ .............................. H04N 1/409; G06T 5/00
[52] U.S. Cl. ...................... 382/266; 382/269; 382/275; 348/606
[58] Field of Search .................................. 382/264, 263, 382/261, 260, 266, 254; 358/447, 463; 348/606, 607, 625

[56] References Cited

U.S. PATENT DOCUMENTS

| 5,111,285 | 5/1992 | Fujita et al. ............................. 358/463 |
| 5,111,511 | 5/1992 | Ishii et al. ............................... 382/263 |
| 5,130,820 | 7/1992 | Hirota ..................................... 358/447 |
| 5,666,443 | 9/1997 | Kumashiro ............................. 382/266 |
| 5,719,962 | 2/1998 | Sugahara et al. ...................... 382/261 |
| 5,757,977 | 5/1998 | Mancuso et al. ...................... 382/260 |

FOREIGN PATENT DOCUMENTS

| 0331017 | 9/1989 | European Pat. Off. . |
| 686104 | 3/1994 | Japan . |
| 2234133 | 1/1991 | United Kingdom . |

Primary Examiner—Scott Rogers
Attorney, Agent, or Firm—Pollock, Vande Sande & Amernick

[57] ABSTRACT

A video signal processing circuit for processing a video signal including a noise is disclosed which comprises: an edge enhancement signal generation circuit for generating an edge enhancement signal from the video signal; a noise reduction circuit for reducing a level of the noise to generate a noise reduced video signal; and an adder for adding the edge enhancement signal to the noise reduction video signal to output a processed video signal. The apparatus may further comprise an input terminal for receiving the video signal, wherein the edge enhancement signal generation circuit and the noise reduction circuit coupled to the input terminal are in parallel. This apparatus may further comprise a first delay circuit for delaying the video signal by one horizontal line period to generate a 1-H delayed video signal and a second delay circuit responsive to the video signal for generating a 2-H delayed video signal, wherein the edge enhancement signal generation circuit generates the edge enhanced signal from the video signal, the 1-H delayed video signal, and the 2-H delayed video signal and the noise reduction circuit generates the noise reduced video signal from the video signal, the 1-H delayed video signal, and the 2-H-delayed video signal.

4 Claims, 4 Drawing Sheets

FIG. 2
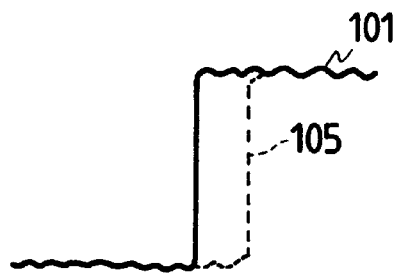
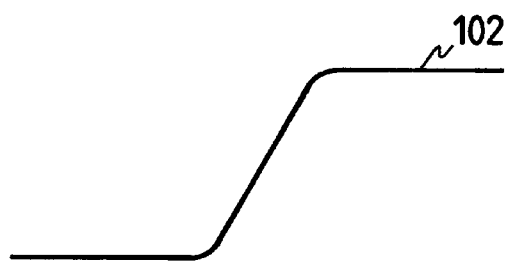
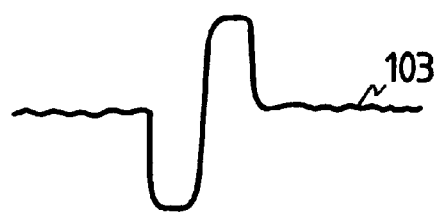
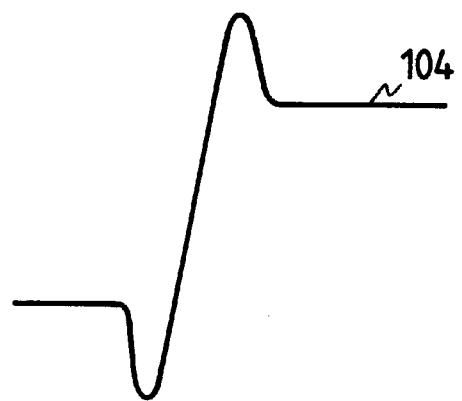

FIG. 4 PRIOR ART
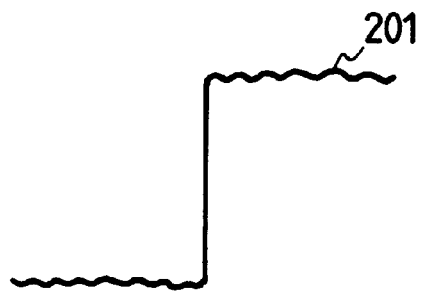
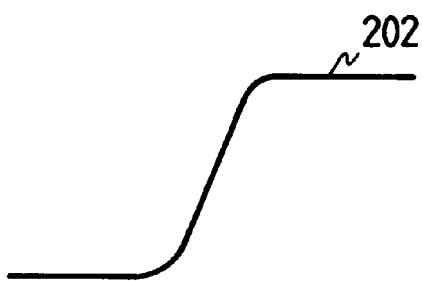
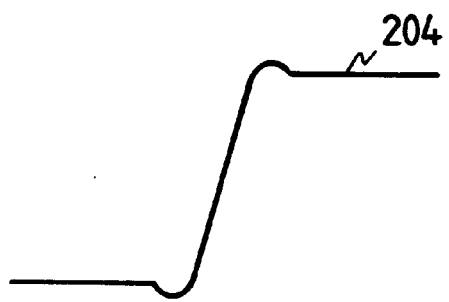

VIDEO SIGNAL PROCESSING APPARATUS WITH NOISE REDUCTION AND EDGE ENHANCEMENT

BACKGROUND OF THE INVENTION

1. Field of the Invention

This invention relates to a video signal apparatus with noise reduction and edge enhancement for processing a video signal.

2. Description of the Prior Art

A video signal processing apparatus for processing a video signal with reduction of noise and edge enhancement is known. FIG. 3 is a block diagram of a prior art video signal processing apparatus. This prior art video processing apparatus comprises a line memory 2 for delaying a video signal inputted to an input terminal Ti' by one horizontal line (scanning) period (1H), a line memory 3 for delaying an output of the line memory 2 by 1H, a noise reduction circuit 1, supplied with the video signal, the output of the line memory 2, and an output of the line memory 3, for reducing noises in the video signal through two-dimensional filtering, a line memory 8 for delaying an output of the noise reduction circuit 1 by 1H, a line memory 9 for delaying an output of the line memory 8 by 1H, a horizontal edge enhancement signal generation circuit 5 for generating a horizontal edge enhancement signal from an output of the line memory 8, a vertical edge enhancement signal generation circuit 4 for generating a vertical edge enhancement signal from outputs of the noise reduction circuit 1, the line memory 8, and the line memory 9, an adder 6 for summing the horizontal edge enhancement signal and the vertical edge enhancement signal, and an adder 7 for summing the output of the line memory 9 and an output of the adder 6.

The noise reduction circuit 1 reducing noise in the video signal through two-dimensional filtering is disclosed in Japanese patent application provisional publication No. 6-86104.

An operation of this prior art video processing apparatus will be described. FIG. 4 is a graphical drawing of the prior art video signal processing apparatus showing waveforms of output signals at respective points shown in FIG. 3. The line memory 2 delays the video signal, having a waveform 201, inputted through the input terminal Ti', by one horizontal scanning period (1H) to produce a one-H delayed video signal. The line memory 3 delays the output of the line memory 2 to produce two-H delayed video signal. The noise reduction circuit 1, supplied with the video signal, the one-H delayed video signal, and the two-H delayed video signal reduces noises in the video signal through two-dimensional filtering as shown by a waveform 202. The line memory 8 delays the output of the noise reduction circuit 1 by 1H. The line memory 9 delays the output of the line memory 8 by one horizontal scanning line. The horizontal edge enhancement signal generation circuit 5 generates the horizontal edge enhancement signal from the output of the line memory 8. The vertical edge enhancement signal generation circuit 4 generates the vertical edge enhancement signal from outputs of the noise reduction circuit 1, the line memory 8, the line memory 9. The adder 6 sums the horizontal edge enhancement signal and the vertical edge enhancement signal to produce an edge enhancement signal as shown by a waveform 203. The adder 7 sums the output of the line memory 9 and an output of the adder 6 to produce an edge enhanced video signal as shown by a waveform 204.

SUMMARY OF THE INVENTION

The present invention has been developed in order to provide an improved video signal processing apparatus with noise reduction and edge enhancement.

According to the present invention there is provided a first video signal processing apparatus for processing a video signal including noise comprising: an edge enhancement signal generation circuit for generating an edge enhancement signal from the video signal: a noise reduction circuit for reducing a level of the noise to generate a noise reduced video signal; and an adder for adding the edge enhancement signal to the noise reduction video signal to output a processed video signal.

This first video signal processing apparatus may further comprise an input terminal for receiving the video signal, wherein the edge enhancement signal generation circuit and the noise reduction circuit are coupled to the input terminal in parallel.

This first video signal processing apparatus may further comprise a first delay circuit for delaying the video signal by one horizontal line period to generate a one-horizontal-line-period-delayed video signal and a second delay circuit responsive to the video signal for generating a two-horizontal-line-period-delayed video signal, wherein the edge enhancement signal generation circuit generates the edge enhanced signal from the video signal, the one-horizontal-line-period-delayed video signal, and the two-horizontal-line-period-delayed video signal and the noise reduction circuit generates the noise reduced video signal from the video signal, the one-horizontal-line-period-delayed video signal, and the two-horizontal-line-period-delayed video signal.

In this first video signal processing apparatus, the edge enhancement signal generation circuit may comprise a horizontal edge enhancement signal generation circuit responsive to the video signal for generating a horizontal edge enhancement signal, a vertical edge enhancement signal generation circuit responsive to the video signal for generating a vertical edge enhancement signal, and a second adder for adding the vertical edge enhancement signal to the horizontal edge enhancement signal to generate the edge enhancement signal. Moreover, this apparatus may further comprise a first delay circuit for delaying the video signal by one horizontal line period to generate a one-horizontal-line-period-delayed video signal and a second delay circuit responsive to the video signal for generating a two-horizontal-line-period-delayed video signal, wherein the horizontal edge enhancement signal generation circuit generates the horizontal edge enhancement signal from the one-horizontal-period-delayed video signal and the vertical edge enhancement signal generation circuit generates the vertical edge enhancement signal from the video signal, the one-horizontal-period-delayed video signal, and the two-horizontal-period-delayed video signal.

According to the present invention there is also provided a second video signal processing apparatus for processing a video signal including a noise comprising: a first line memory for delaying a video signal by one horizontal line period to generate a one-horizontal-line-period-delayed video signal; a second line memory responsive to the video signal for generating a two-horizontal-line-period delayed video signal; a noise reduction circuit responsive to the video signal, the one-horizontal-line-period-delayed signal, and the two-horizontal-line-period-delayed signal for reducing a level of the noise to generate a noise reduced video signal through two-dimensional filtering; a horizontal edge enhancement signal generation circuit responsive to the one-horizontal-line-delayed signal for generating a horizontal edge enhancement signal; a vertical edge enhancement signal generation circuit responsive to the video signal, the one-horizontal-line-delayed signal, and the two-horizontalline-delayed signal for generating a vertical edge enhancement signal; a first adder for adding the vertical edge enhancement signal to the horizontal edge enhancement signal to generate an edge enhancement signal; and a second adder for adding the edge enhancement signal to the video signal to generate an edge enhanced video signal to output an edge enhanced video signal.

BRIEF DESCRIPTION OF THE DRAWINGS

The objects and features of the present invention will become more readily apparent from the following detailed description taken in conjunction with the accompanying drawings in which:

FIG. 2 is a graphical drawing of the video signal processing circuit showing waveforms at respective points in the video signal processing circuit shown in FIG. 1;

FIG. 4 is a graphical drawing of the prior art video signal processing apparatus showing waveforms at respective points in FIG. 3.

The same or corresponding elements or parts are designated with like references throughout the drawings.

DETAILED DESCRIPTION OF THE INVENTION

Hereinbelow will be described a first embodiment of this invention.

Figure 1:
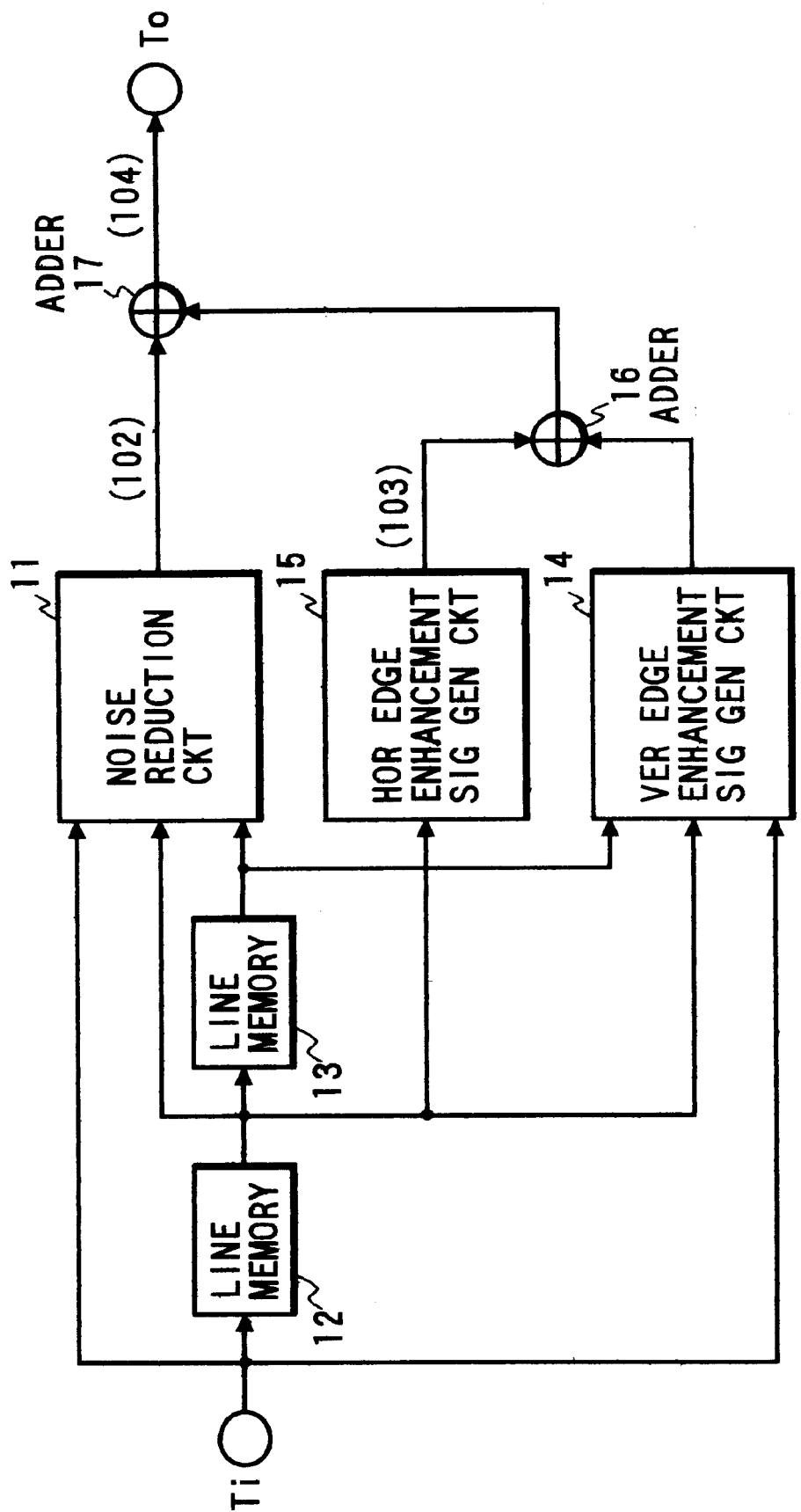
FIG. 1 is a block diagram of a video signal processing circuit of this invention.
Figure 3:
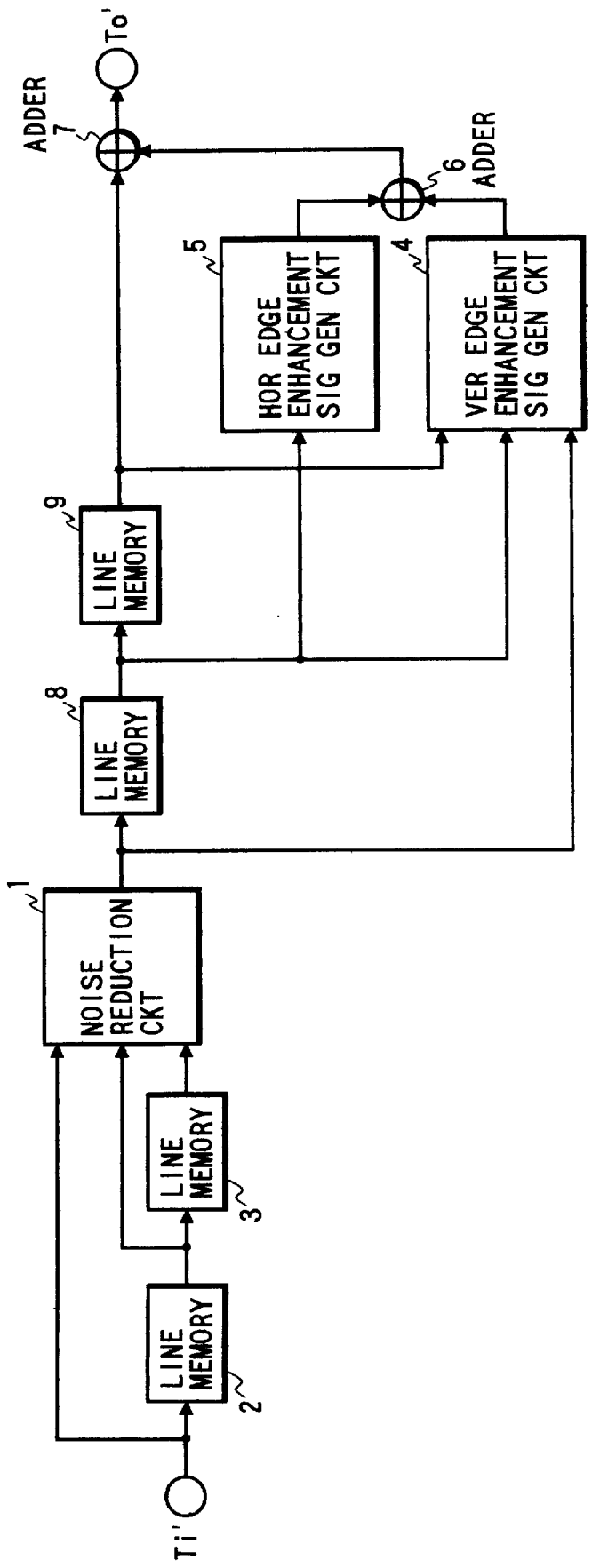
FIG. 3 is a block diagram of a prior art video signal processing apparatus.

FIG. 1 is a block diagram of a video signal processing circuit of this invention. FIG. 2 is a graphical drawing of the video signal processing circuit showing waveforms at respective points of the video signal processing circuit shown in FIG. 1. The video signal processing circuit of this invention comprises a line memory 12 for delaying a video signal, having a waveform 101, inputted through an input terminal Ti, by one-horizontal line (1-H) to produce one-H delayed video signal, a line memory 13 for delaying the one-H delayed video signal from the line memory 12 by one-H to produce two-H delayed video signal, a noise reduction circuit 11, supplied with the video signal, the one-H delayed signal, and the two-H dealed signal, for reducing levels of noise included in the video signal to produce a noise reduced video signal as shown by waveform 102 through two-dimensional Filtering, a horizontal edge enhancement signal generation circuit 15, supplied with the one-H delayed signal, for generating a horizontal edge enhancement signal as shown by a waveform 103, a vertical edge enhancement signal generation circuit 14, supplied with the video signal, the one-H delayed signal, and the two-H dealed signal, for generating a vertical edge enhancement signal, an adder 16 for adding the vertical edge enhancement signal to the horizontal edge enhancement signal to produce edge enhancement signal, an adder 17 for adding the edge enhancement signal to the video signal to produce an edge enhanced video signal, as shown by a waveform 104 and output the edge enhanced video signal at a terminal To.

An operation of the video signal processing circuit of this invention will be described. The line memory 12 delays the video signal, having a waveform 101, inputted through an input terminal Ti by one-H to produce one-H delayed video signal. The line memory 13 delays the one-H delayed video signal from the line memory 12 by one-H to produce two-H delayed video signal. The noise reduction circuit 11, supplied with the video signal, the one-H delayed signal, and the two-H dealed signal, for reducing levels of noises included in the video signal or suppressing the noises to produce a noise-reduced video signal as shown by waveform 102 through two-dimensional filtering. For example, the noise reduction device as disclosed in Japanese patent application provisional publication No 6-86104 can be used for this noise reduction circuit 11.

The horizontal edge enhancement signal generation circuit 15, supplied with the one-H delayed signal, comprises a delay circuit (not shown) for delaying the one-H delayed signal by one or more pixel periods to produce a delay signal as shown by a waveform 105 and detects and generates the horizontal edge enhancement signal through a differential operation between one-H delayed signal and the delay signal as shown by the waveform 105. The vertical edge enhancement signal generation circuit 14, supplied with the video signal, the one-H delayed signal, and the two-H dealed signal, detects and generates the vertical edge enhancement signal through a differential operation among the video signal, the one-H delayed signal as is well known. The adder 16 adds the vertical edge enhancement signal to the horizontal edge enhancement signal to produce the edge enhancement signal. The adder 17 adds the edge enhancement signal to the video signal to produce the edge enhanced video signal, as shown by a waveform 104 and output the edge enhanced video signal at a terminal To.

The noise reduction circuit 11 suppresses the noise included in the video signal irrespective of operations of the horizontal edge enhancement signal generation circuit 15 and the vertical edge enhancement signal generation circuit 14, so that a degree of the noise reduction can be determined irrespective of the operations of the horizontal edge enhancement signal generation circuit 15 and the vertical edge enhancement signal generation circuit 14.

Similarly, the horizontal edge enhancement signal generation circuit 15 and the vertical edge enhancement signal generation circuit 14 generates the horizontal edge enhancement signal and the vertical edge enhancement signal respectively, irrespective of the operation of the noise reduction circuit 11, so that the horizontal and vertical edge enhancement signals can generate sharp horizontal and vertical edge enhancement signals respectively.

Moreover, the delayed video signals from the line memories 12 and 13 are commonly used for the noise reduction circuit 11 and for the edge enhancement circuit including the horizontal edge enhancement signal generation circuit 15 and the vertical edge enhancement signal generation circuit 14.

What is claimed is:

1. A video signal processing apparatus for processing a video signal including noise comprising:

a first delay circuit for delaying the video signal by one horizontal line period to generate a one-horizontal-line-period-delayed video signal and a second delay circuit responsive to the video signal for generating a two-horizontal-line-period-delayed video signal, edge enhancement signal generation means for generating horizontal and vertical edge enhancement signals from the video signal, the one-horizontal-line period-delayed video signal, and the two-horizontal-line-period-delayed video signal;

noise reduction means for reducing a level of the noise to generate a noise reduced video signal from said video signal, said one-horizontal-line-period-delayed video signal, and said two horizontal-line-period-delayed video signal; and adding means for adding the edge enhancement signals to the noise reduction video signal to output a processed video signal.

2. A video signal processing apparatus for processing a video signal including noise comprising:

edge enhancement signal generation means for generating horizontal and vertical edge enhancement signals from the video signal;

said edge enhancement signal generation circuit comprising a horizontal edge enhancement signal generation circuit responsive to said video signal for generating a horizontal edge enhancement signal, a vertical edge enhancement signal generation circuit responsive to said video signal for generating a vertical edge enhancement signal, and adding means for adding said vertical edge enhancement signal to said horizontal edge enhancement signal to generate said edge enhancement signal noise reduction means for reducing a level of the noise to generate a noise reduced video signal; and second adding means for adding the edge enhancement signals to the noise reduction video signal to output a processed video signal.

3. A video signal processing apparatus as claimed in claim 2, further comprising a first delay circuit for delaying said video signal by one horizontal line period to generate a one-horizontal-line-period-delayed video signal and a second delay circuit responsive to said video signal for generating a two-horizontal-line-period-delayed video signal, wherein said horizontal edge enhancement signal generation circuit generates said horizontal edge enhancement signal from said one-horizontal-line-period-delayed video signal and said vertical edge enhancement signal generation circuit generates said vertical edge enhancement signal from said video signal, one-horizontal-line-period-delayed video signal, and two-horizontal-line-period-delayed video signal.

4. A video signal pressing apparatus for processing a video signal including noise comprising:

a first line memory for delaying a video signal by one horizontal line period to generate a one-horizontal-line-period-delayed video signal;

a second line memory responsive to said video signal for generating a two-horizontal-line-period delayed video signal;

a noise reduction circuit responsive to said video signal, said one-horizontal-line-period-delayed signal, and said two-horizontal-line-period-delayed signal for reducing a level of said noise to generate a noise reduced video signal through two-dimensional filtering;

a horizontal edge enhancement signal generation circuit responsive to said one-horizontal-line-delayed signal for generating a horizontal edge enhancement signal;

a vertical edge enhancement signal generation circuit responsive to said video signal, said one-horizontal-line-delayed signal, and said two-horizontal-line delayed signal for generating a vertical edge enhancement signal;

a first adder for adding said vertical edge enhancement signal to said horizontal edge enhancement signal to generate an edge enhancement signal; and a second adder for adding said edge enhancement signal to said video signal to generate an edge enhanced video signal to output an edge enhanced video signal.

* * * * *